(12) United States Patent
Sugawara et al.

(10) Patent No.: US 10,488,173 B2
(45) Date of Patent: Nov. 26, 2019

(54) ELECTROMAGNETIC ACTUATOR

(71) Applicant: MITSUBISHI ELECTRIC CORPORATION, Tokyo (JP)

(72) Inventors: Masafumi Sugawara, Tokyo (JP); Toru Ogawa, Tokyo (JP); Satoshi Tesen, Tokyo (JP); Hideaki Arita, Tokyo (JP); Akihiro Daikoku, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/564,983

(22) PCT Filed: May 14, 2015

(86) PCT No.: PCT/JP2015/063911
§ 371 (c)(1),
(2) Date: Oct. 6, 2017

(87) PCT Pub. No.: WO2016/181551
PCT Pub. Date: Nov. 17, 2016

(65) Prior Publication Data
US 2018/0087887 A1    Mar. 29, 2018

(51) Int. Cl.
*G01B 7/00* (2006.01)
*H01F 7/16* (2006.01)
(Continued)

(52) U.S. Cl.
CPC .......... *G01B 7/003* (2013.01); *F01L 13/0036* (2013.01); *F02D 35/0007* (2013.01);
(Continued)

(58) Field of Classification Search
CPC .................. G01B 7/003; F01L 13/0036; F01L 2013/0052; F01L 2820/031;
(Continued)

(56) References Cited

U.S. PATENT DOCUMENTS

2004/0100345 A1    5/2004    Kobayashi
2010/0008009 A1*   1/2010    Cartier-Millon ........ H01F 7/081
                                                              361/156
2016/0217896 A1*   7/2016    Gilmore .................. H01F 7/122

FOREIGN PATENT DOCUMENTS

CN    100447914 C    12/2008
JP    6-77046 A       3/1994
(Continued)

OTHER PUBLICATIONS

Summons from the German Patent Office issued in corresponding German Patent Application No. 11 2015 006 534.2 dated Oct. 11, 2018.

*Primary Examiner* — Melissa J Koval
*Assistant Examiner* — Trung Nguyen
(74) *Attorney, Agent, or Firm* — Birch, Stewart, Kolasch & Birch, LLP

(57) ABSTRACT

The magnetic resistance of a magnetic path that passes through a coil (6) is increased by magnetically dividing a stator core into a plurality of divided cores (4, 5) in such a manner that the magnetic flux of a permanent magnet (7) flows through the magnetic path when a projection (82) of a plunger (8) magnetically connects the divided cores (4, 5), hence the magnetic resistance of the magnetic path that passes through the coil (6) rapidly changes due to a positional relationship between a gap between the divided cores (4, 5) and the plunger (8), and the magnetic flux that flows through the magnetic path rapidly changes, and moreover a large back electromotive force is produced.

13 Claims, 14 Drawing Sheets

(51) Int. Cl.
    *F01L 13/00*     (2006.01)
    *F02D 35/00*     (2006.01)
    *H01F 7/122*     (2006.01)
    *H01F 7/08*      (2006.01)
    *H01F 7/18*      (2006.01)

(52) U.S. Cl.
    CPC .............. *H01F 7/081* (2013.01); *H01F 7/122* (2013.01); *H01F 7/16* (2013.01); *H01F 7/1646* (2013.01); *F01L 2013/0052* (2013.01); *F01L 2820/031* (2013.01); *F16D 2500/1022* (2013.01); *H01F 2007/086* (2013.01); *H01F 2007/185* (2013.01)

(58) Field of Classification Search
    CPC ...... F02D 35/0007; H01F 7/081; H01F 7/122; H01F 7/16; H01F 7/1646; H01F 2007/086; H01F 2007/185; F16D 2500/1022
    USPC ........ 324/219–252, 200, 207.1–207.24, 500, 324/529–530, 750.12, 750.21, 754.17, 324/754.29; 73/514.31, 514.39, 520.01, 73/779, 862.193, 862.333
    See application file for complete search history.

(56) References Cited

FOREIGN PATENT DOCUMENTS

| | | |
|---|---|---|
| JP | 2010-73705 A | 4/2010 |
| JP | 2013-239538 A | 11/2013 |
| JP | 2014-20260 A | 2/2014 |
| JP | 5590423 B2 | 9/2014 |

\* cited by examiner

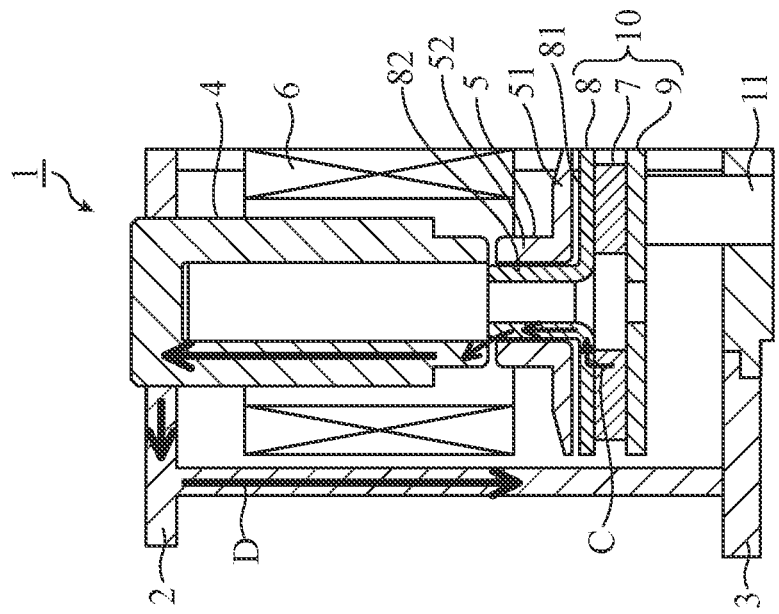
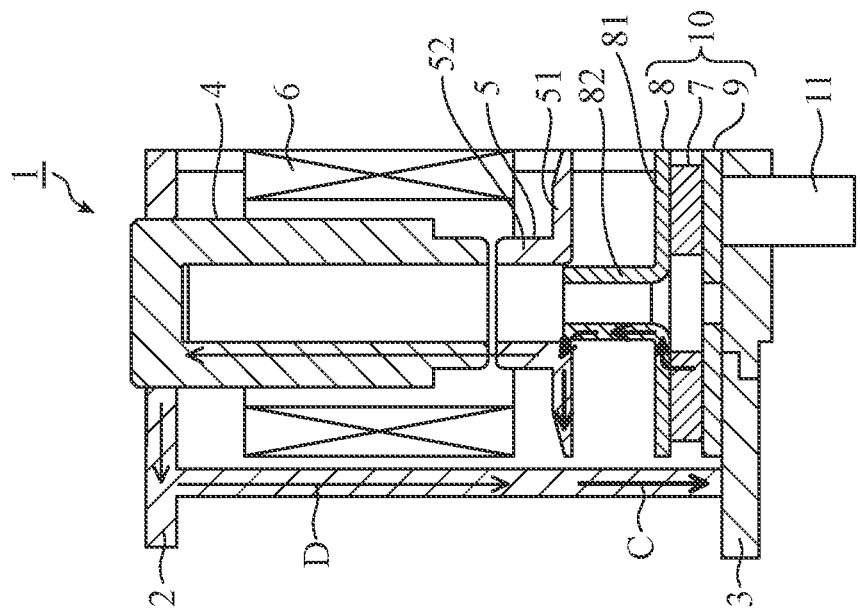

ELECTROMAGNETIC ACTUATOR

TECHNICAL FIELD

The invention relates to electromagnetic actuators capable of detecting the position of a plunger.

BACKGROUND ART

In some internal combustion engines, a lift amount of a valve is adjusted by switching between two types of cams, a high cam and a low cam, which are installed in a camshaft that operates intake and exhaust valves, in accordance with the rotational frequency of an internal combustion engine. The switching of the cams is carried out by engaging a regulating pin with a spiral groove formed in a cam to slide the cam in the axial direction of the camshaft. To operate the regulating pin, an electromagnetic actuator is used (see, e.g., Patent Literature 1).

The electromagnetic actuator described in Patent Literature 1 includes two plungers that are coupled with two regulating pins, two permanent magnets that attract the two plungers in a direction away from a cam, one coil that reduces the attraction force of the permanent magnets to allow the plungers to advance toward the cam, and two springs that cause the two plungers to advance. In an initial state, the coil is not energized and the two plungers are held by being attracted to the two permanent magnets. Since the two permanent magnets are disposed, with magnetic poles thereof being reversed to each other, the attraction force of one of the permanent magnets is reduced by energizing the coil, the plunger attracted to the permanent magnet advances with the biasing force of the spring, and the regulating pin engages with a spiral groove of the cam. After the energization to the coil is interrupted, when the regulating pin is pushed back by the cam, the plunger is attracted to the permanent magnet and is held at an initial position. Thus, the attraction force of one of the two permanent magnets is reduced by switching the energization direction of the coil, and the regulating pin on the side of the permanent magnet of which the attraction force is reduced is actuated.

In addition, the electromagnetic actuator described in Patent Literature 1 includes a function of detecting a plunger position. When the regulating pin is pushed back, the magnetic flux of the permanent magnet flowing along a magnetic path that passes through the coil is increased as the plunger approaches the permanent magnet, whereby a back electromotive force is generated between the two ends of the coil. The position of the plunger is detected by detecting the back electromotive force.

CITATION LIST

Patent Literature

Patent Literature 1: Japanese Patent Application Laid-open No. 2013-239538

SUMMARY OF INVENTION

Technical Problem

In the electromagnetic actuator described in Patent Literature 1, since the magnetic flux that passes through the coil is gradually increased as the plunger approaches the permanent magnet, there has been a problem in that the back electromotive force is small and it is difficult to detect the back electromotive force.

In addition, since the two permanent magnets are disposed adjacent to each other, with magnetic poles thereof being reversed to each other, a short circuit with the adjacent magnetic pole occurs, the magnetic flux that passes through the coil is reduced, and it is not possible to efficiently generate the back electromotive force. Further, in order to select the plunger that is caused to advance toward the cam, a device for switching the energization direction of the coil is required.

The invention has been made in order to solve the above problems, and an object thereof is to provide an electromagnetic actuator capable of generating a large back electromotive force.

Solution to Problem

An electromagnetic actuator according to the invention includes a casing made of magnetic material; a core installed in the casing; a coil for generating magnetic flux in the core; a permanent magnet for generating an attraction force to or a repulsive force from the core; and a plunger integrated with the permanent magnet and configured to be held at an initial position by attraction of the permanent magnet to the core when the coil is not energized, and to move from the initial position by repulsion of the permanent magnet from the core when the coil is energized, wherein the core has a structure in which a plurality of divided cores, which are magnetically divided, are arranged in a movement direction of the plunger and a hole for allowing the plunger to pass therethrough is formed in at least a divided core of the plurality of the divided cores that is closest to the permanent magnet side, and the plunger is formed in a shape that allows the plunger to enter the core from the hole formed in the divided core up to a position at which at least two of the plurality of the divided cores are magnetically connected to each other, at the initial position.

Advantageous Effects of Invention

According to the invention, the magnetic resistance of the magnetic path that passes through the coil is increased by magnetically dividing the core, and the magnetic flux of the permanent magnet flows through the magnetic path when the plunger magnetically connects the divided cores, and hence the magnetic resistance of the magnetic path that passes through the coil rapidly changes depending on a positional relationship between the divided cores and the plunger, the magnetic flux that flows through the magnetic path rapidly changes, and a large back electromotive force is generated.

BRIEF DESCRIPTION OF DRAWINGS

FIGS. 3A and 3B depict a view explaining a function of detecting the position of a movable element in the electromagnetic actuator according to Embodiment 1.

FIGS. 12A and 12B show an example of a cam switching mechanism to which the electromagnetic actuator according to Embodiment 1 is applied, in which FIG. 12A is a configuration diagram of a principal portion when a high cam is used and FIG. 12B is a cross-sectional view taken along the line G-G.

FIGS. 13A and 13B show an example of the cam switching mechanism to which the electromagnetic actuator according to Embodiment 1 is applied, in which FIG. 13A is a configuration diagram of the principal portion when a low cam is used and FIG. 13B is a cross-sectional view taken along the line H-H.

DESCRIPTION OF EMBODIMENTS

Hereinbelow, in order to describe the invention in greater detail, embodiments of the invention will be described in accordance with the accompanying drawings.
Embodiment 1

Figure 1:
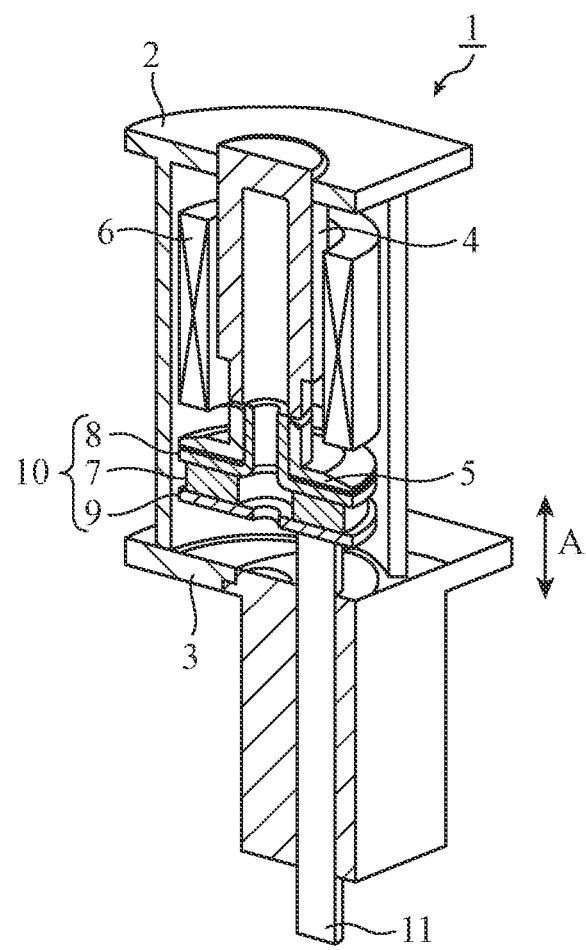
FIG. 1 is a partial cross-sectional perspective view showing an example of the configuration of an electromagnetic actuator according to Embodiment 1 of the invention.
Figure 2:
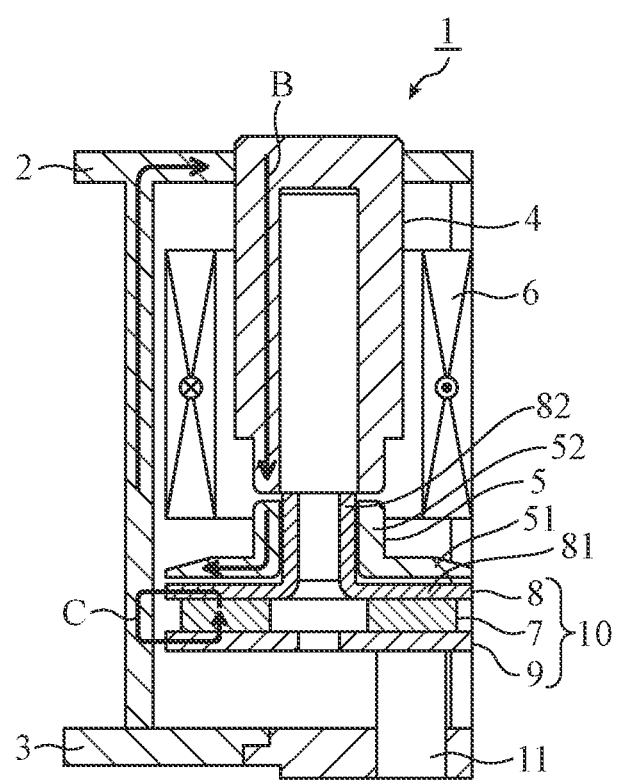
FIGS. 2 is a cross-sectional view showing the example of the configuration of the electromagnetic actuator according to Embodiment 1 and shows an energized state.

Each of FIG. 1 and FIG. 2 is a view showing an example of the configuration of an electromagnetic actuator 1 according to Embodiment 1 of the invention. As shown in the drawings, the electromagnetic actuator 1 includes casings 2 and 3 each made of magnetic material, a plurality of divided cores 4 and 5 that are installed in the casings 2 and 3, a coil 6 that generates magnetic flux in the divided cores 4 and 5, a permanent magnet 7 that generates an attraction force to and a repulsive force from the divided cores 4 and 5, and plungers 8 and 9 that are integrated with the permanent magnet 7. In addition, a regulating pin 11 is mounted to the plunger 9.

A stator is constituted by the casings 2 and 3, the divided cores 4 and 5, and the coil 6. A stator core is divided into two cores of the divided cores 4 and 5. A movable element 10 is constituted by the permanent magnet 7 and the plungers 8 and 9. An arrow A shown in FIG. 1 indicates the movement direction of the movable element 10, and the movable element 10 and the regulating pin 11 reciprocate integrally with each other. In FIG. 1 and FIG. 2, the movable element 10 is at an initial position.

The casings 2 and 3, the divided cores 4 and 5, and the plungers 8 and 9 are made of magnetic material. The coil 6 is fixed in the casing 2, and the divided cores 4 and 5 are fixed inside the coil 6. The divided cores 4 and 5 are arranged along the movement direction A of the movable element 10. In addition, the divided core 4 and the divided core 5 are arranged so as to form a gap between them. The gap between the divided cores 4 and 5 is a "division portion". The divided core 4 arranged distant from the permanent magnet 7 has a bottomed tubular shape. The divided core 5 arranged close to the permanent magnet 7 has a plate 51 and a projection 52. In the plate 51 and projection 52, there is provided a hole through which a projection 82 of the plunger 8 passes.

Note that the divided core 4 is configured to have the bottomed tubular shape in the example shown in the drawing, but the shape thereof is not necessarily bottomed and may also be tubular.

In addition, the divided core 4 may also be formed as one tubular core by press-fitting a plurality of cores divided in a radial direction. In the casing of this configuration, a plurality of cores is arranged with no gap therebetween in the radial direction, and hence the cores are magnetically connected to each other. Similarly, the divided core 5 may also be formed as one tubular core by press-fitting a plurality of cores divided in the radial direction.

The side of the permanent magnet 7 close to the divided cores 4 and 5 is magnetized as the north pole, and the side thereof far from the divided cores 4 and 5 is magnetized as the south pole. In addition, the permanent magnet 7 is sandwiched between the two plungers 8 and 9, and the plunger 8 is fixed to the surface of the permanent magnet 7 on the side close to the divided cores 4 and 5 and the plunger 9 is fixed to the surface thereof on the side far from the divided cores 4 and 5. The plunger 8 has a plate 81 and the projection 82. The projection 82 is arranged coaxially with the divided cores 4 and 5 and can enter the divided cores 4 and 5 from the hole formed in the divided core 5. The plunger 9 has a plate-like shape.

In a non-energized state in which the coil 6 is not energized, as shown in FIG. 1, the permanent magnet 7 is attracted to the divided cores 4 and 5, and the movable element 10 is thereby held at the initial position.

When the coil 6 is energized, as shown in FIG. 2, magnetic flux B is generated in the divided cores 4 and 5, and flows to the divided core 5, the divided core 4, and the casing 2. On the other hand, magnetic flux C of the permanent magnet 7 flows to the plunger 9, the permanent magnet 7, and the plunger 8. Accordingly, the maximum repulsive force is generated between the plate 51 of the divided core 5 and the plate 81 of the plunger 8 immediately after the start of the energization, and the movable element 10 moves toward the casing 3. Subsequently, the permanent magnet 7 is attracted to the casing 3, and the movable element 10 is thereby held at an operation position.

When the energization to the coil 6 is turned off and a force that pushes back the regulating pin 11 is applied from the outside, the movable element 10 is pushed back to the initial position integrally with the regulating pin 11 and is held by the attraction of the permanent magnet 7 to the divided cores 4 and 5. The force that pushes back the regulating pin 11 is provided from, e.g., a cam switching mechanism which will be described later.

Next, with reference to FIG. 3, a description will be given of a function of detecting the position of the movable element 10. FIG. 3A shows the magnetic flux when the movable element 10 is at the operation position, and FIG. 3B shows the magnetic flux when the movable element 10 returns to the initial position from the operation position.

The divided cores 4 and 5 are arranged so as to form the gap therebetween, and hence the divided cores 4 and 5 are magnetically divided, and the magnetic resistance of a magnetic path through which magnetic flux D that passes through the coil 6 flows is large. Accordingly, as shown in FIG. 3A, when the movable element 10 is at a position away from the divided cores 4 and 5, it is difficult for the magnetic flux C of the permanent magnet 7 to pass along the magnetic path of the divided cores 4 and 5, i.e., the magnetic flux D that passes through the coil 6 is small.

The gap between the divided cores 4 and 5 is the division portion that magnetically divides the divided cores 4 and 5 from each other.

The division portion has a large magnetic resistance, and has a cross-sectional area such that magnetic flux density determined by $NI/(R \cdot S)$ is smaller than the saturation magnetic flux density of the stator core, where the magnetic resistance of the magnetic path that passes across the division portion (the cross-sectional area thereof is S) and passes through the coil 6 is represented by R and the magnetomotive force of the coil 6 is represented by NI.

When the movable element 10 moves to the initial position from the operation position, as shown in FIG. 3B, an air gap between the divided core 4 and the plunger 8 is reduced, and the divided cores 4 and 5 are magnetically connected to each other via the plunger 8. With this, the magnetic resistance of the magnetic path through which the magnetic flux D that passes through the coil 6 flows is reduced, and it becomes easy for the magnetic flux C of the permanent magnet 7 to go along the magnetic path of the divided core 4, i.e., the magnetic flux D that passes through the coil 6 is increased. At the initial position, the plate 81 of the plunger 8 abuts on the plate 51 of the divided core 5, and the position of the end of the projection 82 of the plunger 8 and the position of the division portion of the divided cores 4 and 5 are aligned.

Thus, due to a positional relationship between the division portion of the divided cores 4 and 5 and the projection 82 of the movable element 10, the magnetic resistance of the magnetic path that passes through the coil 6 rapidly changes, and the magnetic flux D flowing through the magnetic path rapidly changes. By the rapid change of the magnetic flux D that passes through the coil 6, a large back electromotive force is generated between the two ends of the coil 6. By detecting the back electromotive force with a voltmeter, it becomes possible to detect the position of the movable element 10.

Figure 4:
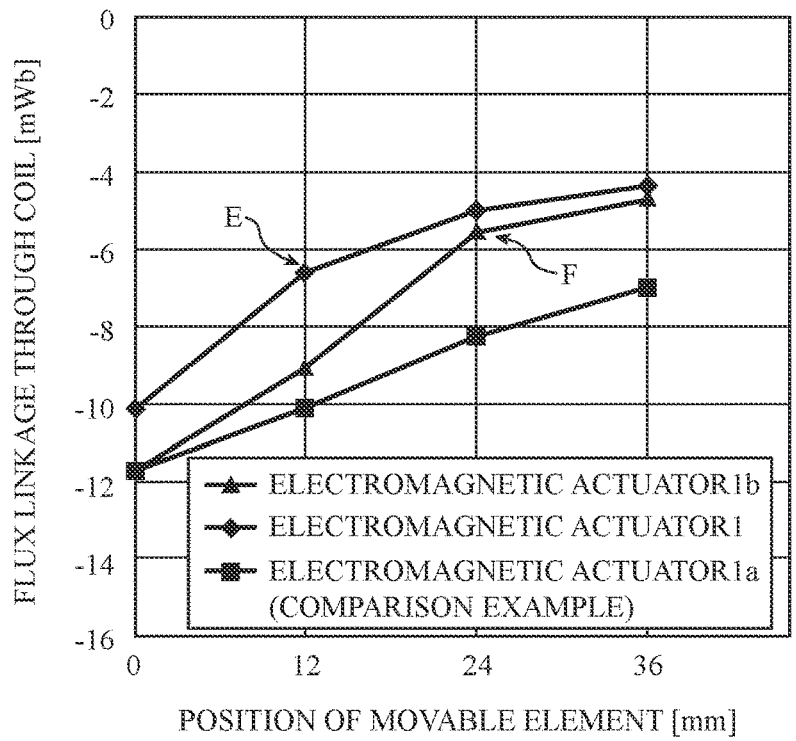
FIG. 4 is a graph showing a relationship between the position of the movable element and magnetic flux that passes through a coil in the electromagnetic actuator according to Embodiment 1.

FIG. 4 is a graph showing a relationship between the position of the movable element 10 and the magnetic flux D passing through the coil 6. The vertical axis of the graph indicates the magnetic flux D passing through the coil 6, and it is assumed that the magnetic flux D is increased as the value of the vertical axis is reduced in the graph. The horizontal axis indicates the position of the movable element 10, and 0 [mm] corresponds to when the movable element 10 is at the initial position and 36 [mm] corresponds to when the movable element 10 is at the operation position. When the movable element 10 moves from the operation position to the initial position, the projection 82 reaches the division portion of the divided cores 4 and 5, the air gap between the divided core 4 and the plunger 8 is narrowed, and the magnetic resistance is reduced, whereby the magnetic flux D rapidly changes (E in FIG. 4), and a large back electromotive force is generated. By detecting the back electromotive force, it becomes possible to detect the return of the movable element 10 to the initial position.

On the other hand, in the casing where the magnetic flux D linearly changes as in an electromagnetic actuator 1*a* in a comparison example, the back electromotive force does not change, and hence it is difficult to detect the position of the movable element 10.

Figure 5:
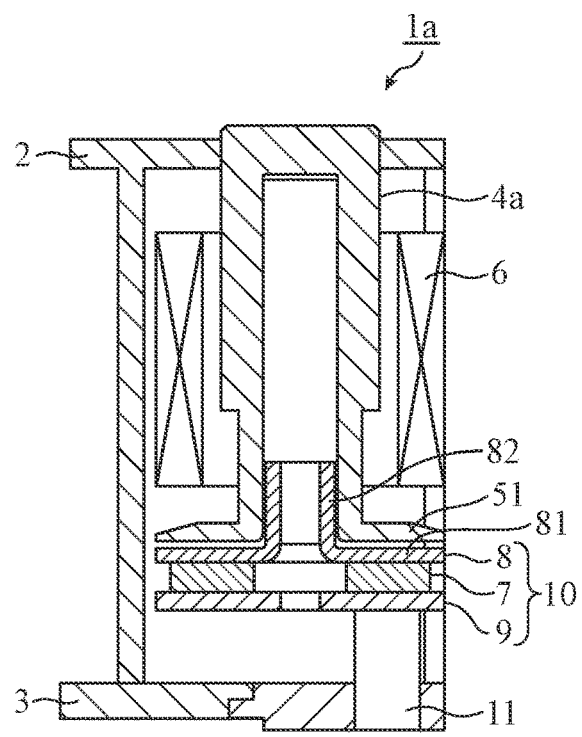
FIG. 5 is a comparison example for facilitating understanding of the electromagnetic actuator according to Embodiment 1 and shows a configuration in which a stator core is not divided.

Herein, as a comparison example for facilitating understanding of the electromagnetic actuator 1 according to Embodiment 1, FIG. 5 shows the electromagnetic actuator 1*a* that includes a core 4*a* that is not divided into the divided cores 4 and 5. The electromagnetic actuator 1*a* in the comparison example has the same configuration as that of the electromagnetic actuator 1 except that the core 4*a* is not divided. In the electromagnetic actuator 1*a* in the comparison example, as the movable element 10 moves from the operation position to the initial position, the magnetic flux of the permanent magnet 7 that goes along the magnetic path of the core 4*a* is gradually increased and the magnetic flux D that passes through the coil 6 is gradually increased.

Note that, in Embodiment 1, the magnetization direction of the permanent magnet 7 may be opposite to the direction shown in FIG. 2. In this casing, the energization direction of the coil 6 is also reversed.

In addition, in Embodiment 1, it is possible to easily change the position at which the magnetic flux D that passes through the coil 6 rapidly changes by adjusting the length of the projection 82 of the plunger 8.

Figure 6:
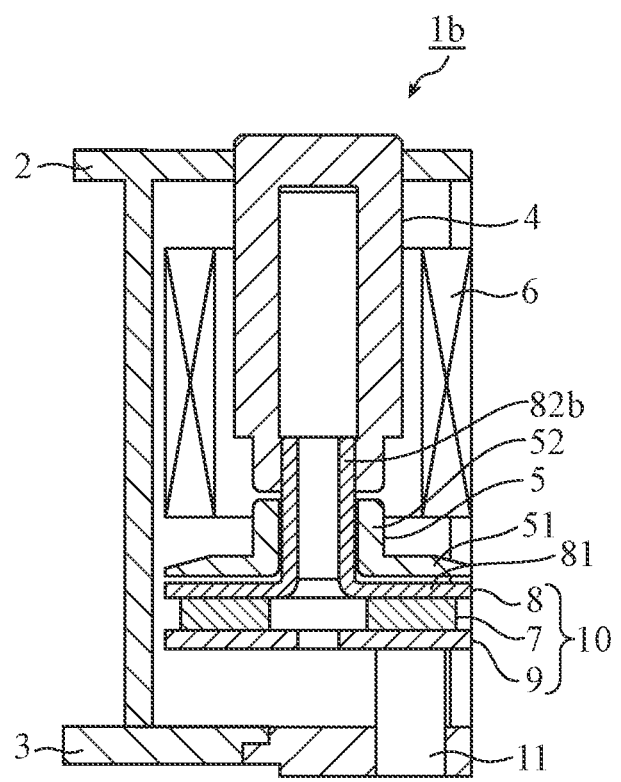
FIG. 6 shows, as a modification of the electromagnetic actuator according to Embodiment 1, a cross-sectional view in which a positional relationship between a division portion of divided cores and a projection of a plunger is modified.

Herein, as a modification of the electromagnetic actuator 1, FIG. 6 shows an electromagnetic actuator 1*b* in which the projection 82 is made longer. The electromagnetic actuator 1*b* has the same configuration as that of the electromagnetic actuator 1 except that a projection 82*b* is made longer such that the end of the projection 82*b* enters the core beyond the division portion of the divided cores 4 and 5 at the initial position. In the electromagnetic actuator 1*b*, when the movable element 10 moves from the operation position to the initial position, the projection 82*b* reaches the division portion of the divided cores 4 and 5 sooner than in the casing of the electromagnetic actuator 1, and hence the magnetic flux D that passes through the coil 6 rapidly changes at the position of 24 [mm] (F in FIG. 4), and a large back electromotive force is generated. Therefore, it is possible to detect the movable element 10 at the position before the initial position.

Next, modifications of the electromagnetic actuator 1 according to Embodiment 1 will be described.

Figure 7A:
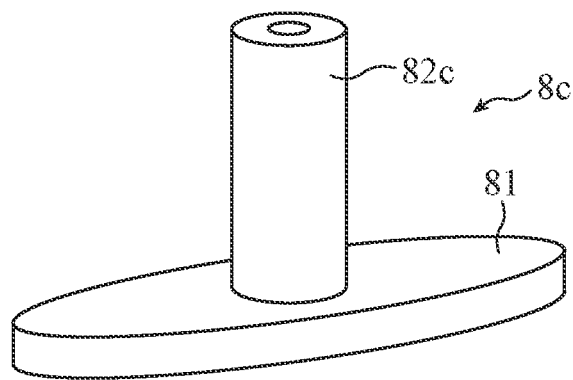
FIGS. 7A to 7C show, as a modification of the electromagnetic actuator according to Embodiment 1, a perspective view in which the plunger is modified.
Figure 7B:
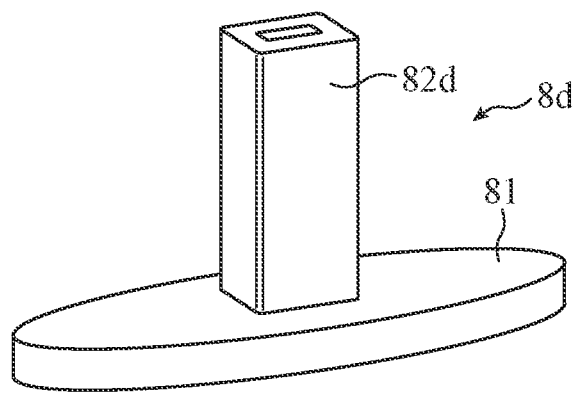
Figure 7C:
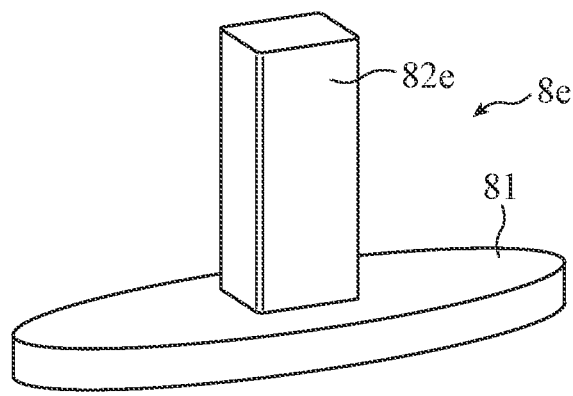

FIG. 7 is a perspective view showing examples of the configurations of plungers 8*c* to 8*e* obtained by modifying the plunger 8. The plunger 8 used in the electromagnetic actuator 1 may be configured to have a cylindrical projection 82*c* like the plunger 8*c* shown in FIG. 7A, maybe configured to have a rectangular tubular projection 82*d* like the plunger 8*d* shown in FIG. 7B, or may also be configured to have a prismatic projection 82*e* like the plunger 8*e* shown in FIG.

7C. Note that the projection 82 may also have shapes other than the cylindrical or prismatic shape, and may also be solid or hollow.

Figure 8A:
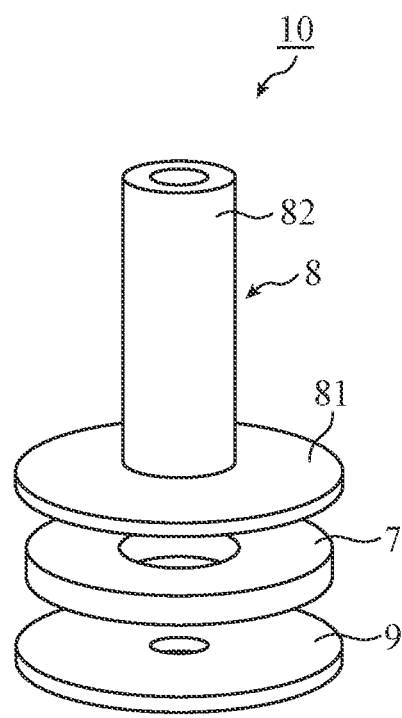
FIGS. 8A and 8B show, as a modification of the electromagnetic actuator according to Embodiment 1, an exploded perspective view in which the movable element is modified.
Figure 8B:
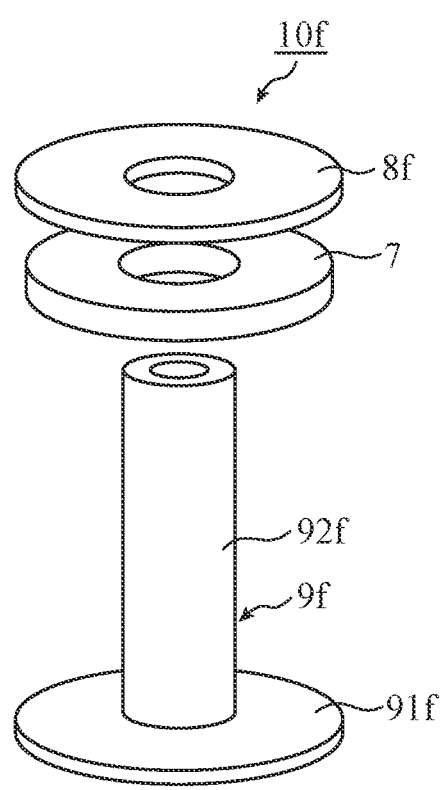

FIG. 8 illustrates an exploded perspective view showing an example of the configuration of a movable element 10f obtained by modifying the movable element 10. The movable element 10 used in the electromagnetic actuator 1 may have a configuration in which the projection 82 is formed on the plate 81 of the plunger 8 on the side close to the divided cores 4 and 5 as shown in FIG. 8A, or may also have a configuration in which a projection 92f is formed on a plate 91f of a plunger 9f on the side far from the divided cores 4 and 5 as in a movable element 10f shown in FIG. 8B.

In the casing of FIG. 8A, the plate 81 is integrated with the projection 82, and hence there is an advantage that it is easy for the magnetic flux of the permanent magnet 7 to flow to the divided cores 4 and 5 through the plate 81 and the projection 82 and it is possible to efficiently generate the back electromotive force.

In the casing of FIG. 8B, the movable element 10f is configured by passing the projection 92f of the plunger 9f through a hole of the permanent magnet 7 and a hole of the plate-like plunger 8f, and hence there is an advantage that it is easy to assemble the movable element 10f as compared with the movable element 10 in FIG. 8A. In addition, the permanent magnet 7 is positioned by the projection 92f, and hence there is also an advantage that the permanent magnet 7 is not easily decentered.

Note that, in the examples in the drawing, the plates of the plungers 8 and 9 and the permanent magnet 7 have the same disk-like shape, but they may have different shapes. In that casing, it is preferable to adopt a configuration in which the plungers 8 and 9 are made larger than the permanent magnet 7 and the permanent magnet 7 is covered with the plungers 8 and 9. With this, it is possible to effectively use leakage flux. In addition, it is possible to protect the permanent magnet 7 that is vulnerable to an impact. Further, by enlarging the plates of the plungers 8 and 9 in the radial direction to cause them to approach the inner wall surface of the casing 2, it is possible to use the casing 2 as the magnetic path through which the magnetic flux of the permanent magnet 7 passes.

Figure 9A:
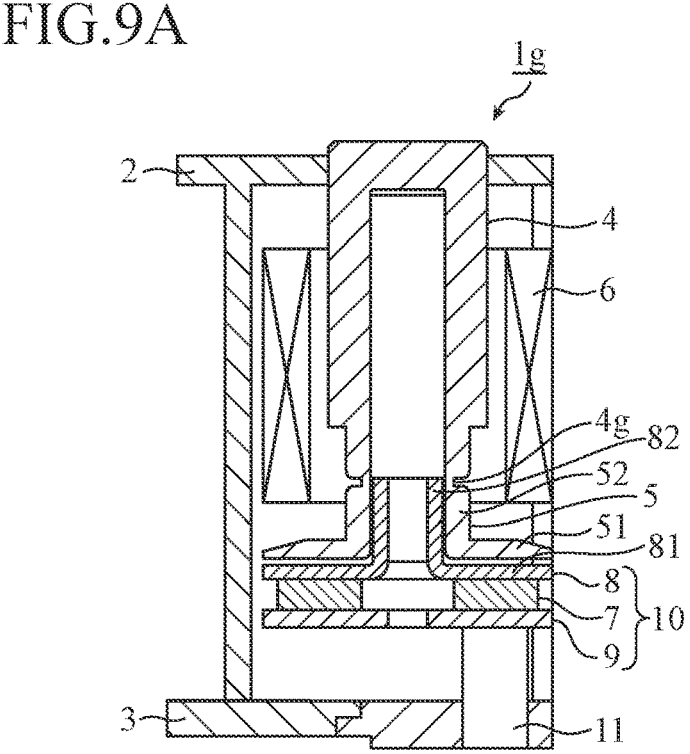
FIGS. 9A and 9B show, as a modification of the electromagnetic actuator according to Embodiment 1, a cross-sectional view in which the stator core is modified.

FIG. 9 illustrates cross-sectional views each showing an example of the configuration of electromagnetic actuators 1g and 1h obtained by modifying the divided cores 4 and 5. In the electromagnetic actuator 1g shown in FIG. 9A, the divided core 4 and the divided core 5 are connected by a connection portion 4g. Note that the thickness of the connection portion 4g is smaller than the thickness of each of the divided cores 4 and 5, and hence the divided cores 4 and 5 are magnetically divided, and the magnetic resistance of the magnetic path that passes through the coil 6 is large similarly to that of the divided cores 4 and 5 that are arranged so as to form the gap therebetween as shown in FIG. 1. The connection portion 4g is the division portion of the divided cores 4 and 5.

Thus, the division portion may be a gap that physically and magnetically divides the stator core as shown in FIG. 1 and other figures, or may also be a thin plate-like division portion that is physically connected but magnetically divided as shown in FIG. 9. Further, although the depiction thereof is omitted, by forming a plurality of holes in the stator core, a division portion that is partially connected and partially divided by the holes physically, and is magnetically divided may also be used.

Figure 9B:
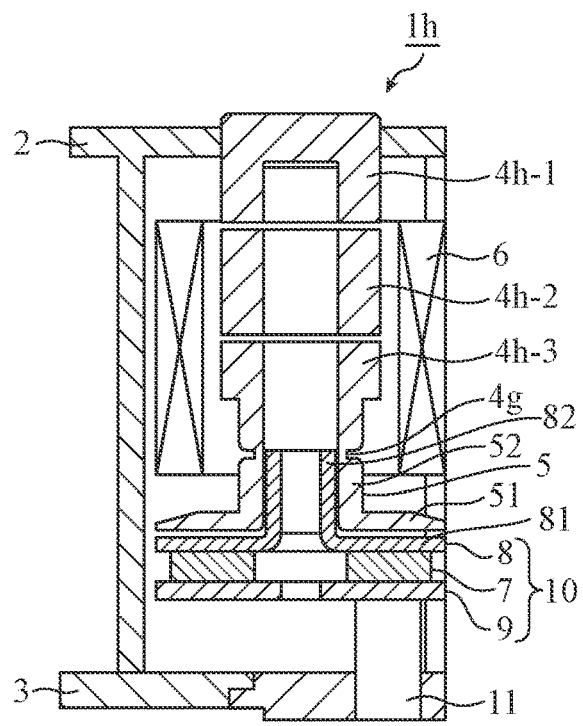

In addition, as in the electromagnetic actuator 1h shown in FIG. 9B, the stator core may also be divided into two or more divided cores 4h-1, 4h-2, 4h-3, and 5. As the number of divisions is increased, the magnetic resistance is increased. Further, in FIG. 9B, a configuration is adopted in which, at the initial position, of the four divided cores, two divided cores 4h-3 and 5 are magnetically connected to each other by the plunger 8, but any divided cores may be magnetically connected to each other.

Figure 10A:
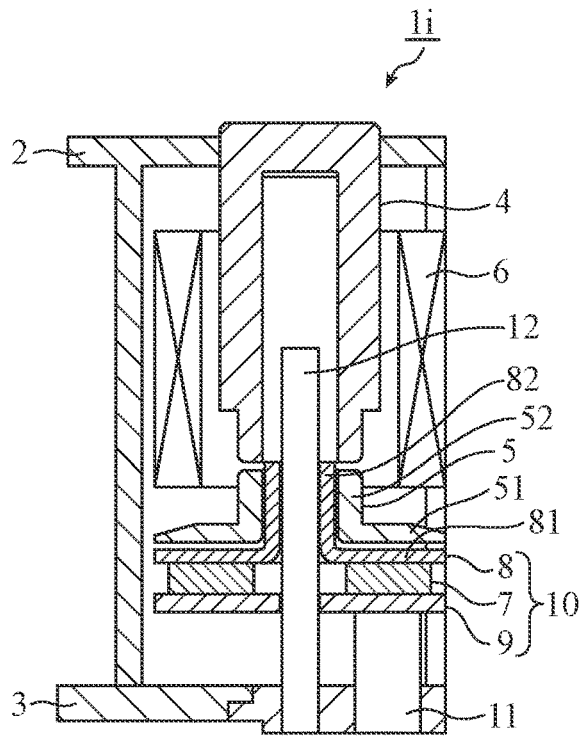
FIGS. 10A and 10B show, as a modification of the electromagnetic actuator according to Embodiment 1, a cross-sectional view of a configuration in which a plunger guide is added.
Figure 10B:
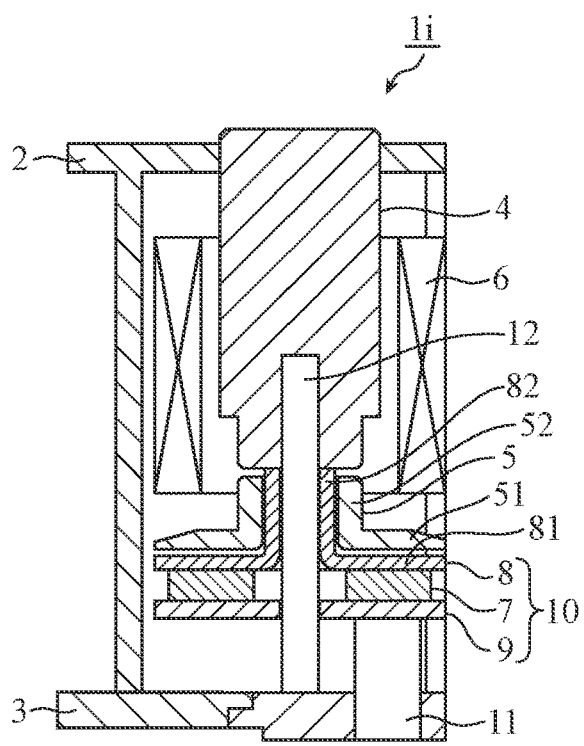

FIG. 10 illustrates cross-sectional views showing each an example of the configuration of an electromagnetic actuator 1i to which a plunger guide 12 is added. In the examples of the configuration shown in FIG. 10A and FIG. 10B, the plunger guide 12 projects into the divided cores 4 and 5 from the casing 3. The plunger guide 12 is passed through the movable element 10, and guides the reciprocation of the movable element 10. With this, it is possible to suppress the decentering of the movable element 10 in the radial direction. FIG. 10A shows an example of the configuration in which the plunger guide 12 is fixed by being press-fitted into the casing 3, and FIG. 10B shows an example of the configuration in which the plunger guide 12 is fixed by being press-fitted into the divided core 4.

Note that FIG. 10 shows the examples of the configuration of the plunger guide 12 provided inside the movable element 10 to guide the movement of the movable element 10, but the configuration thereof is not limited to the above, and a configuration of a plunger guide provided outside the movable element 10 to guide the movement of the movable element 10 may also be adopted.

Figure 11:
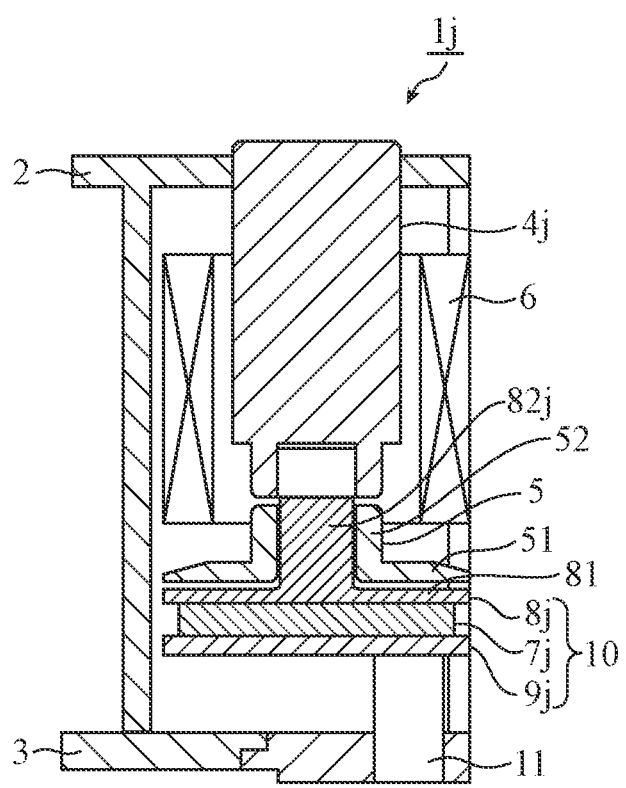
FIG. 11 shows, as a modification of the electromagnetic actuator according to Embodiment 1, a cross-sectional view in which the stator core and the movable element are modified.

FIG. 11 is a cross-sectional view showing an example of the configuration of an electromagnetic actuator 1j obtained by modifying the divided core 4 and the movable element 10. In the electromagnetic actuator 1j shown in FIG. 11, a solid divided core 4j is used. The solid divided core 4j shown in FIG. 11 can flow more magnetic flux of the permanent magnet 7 than that in the casing of the hollow divided core 4 shown in FIG. 1, and hence there is an advantage that a back electromotive force is efficiently generated. Note that a plate 81j and a projection 82j of a plunger 8j, a permanent magnet 7j, and a plunger 9j can also be made solid.

Next, a description will be given of an example of the cam switching mechanism of an internal combustion engine that uses the electromagnetic actuator 1 according to Embodiment 1.

Figure 12A:
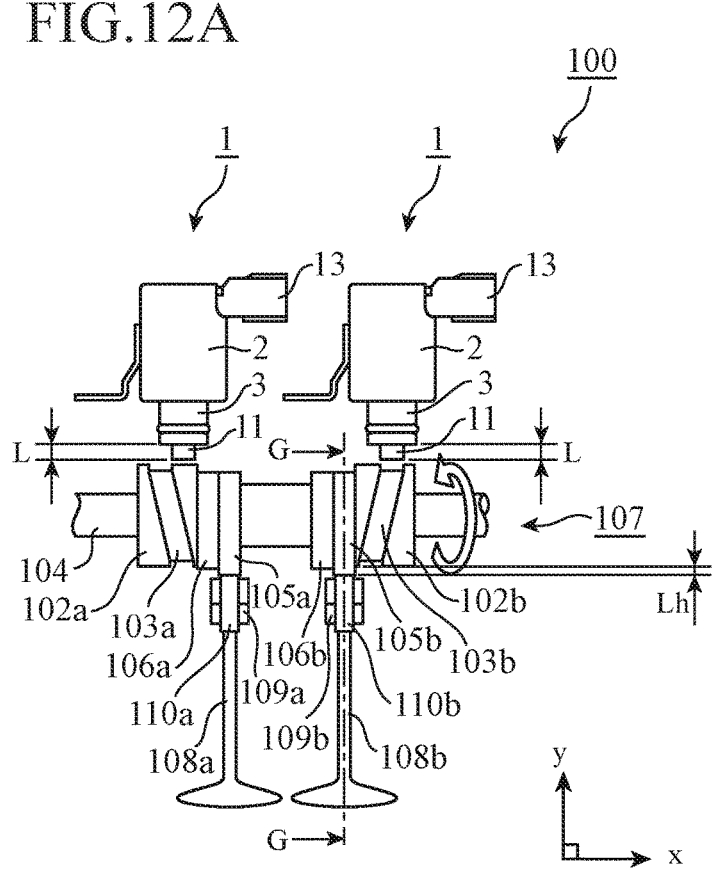
Figure 12B:
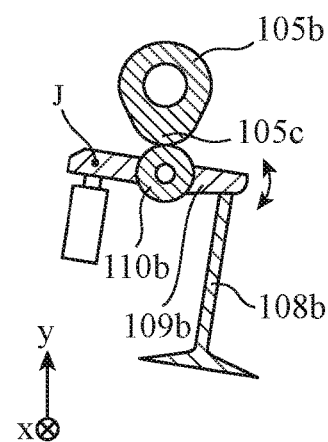
Figure 13A:
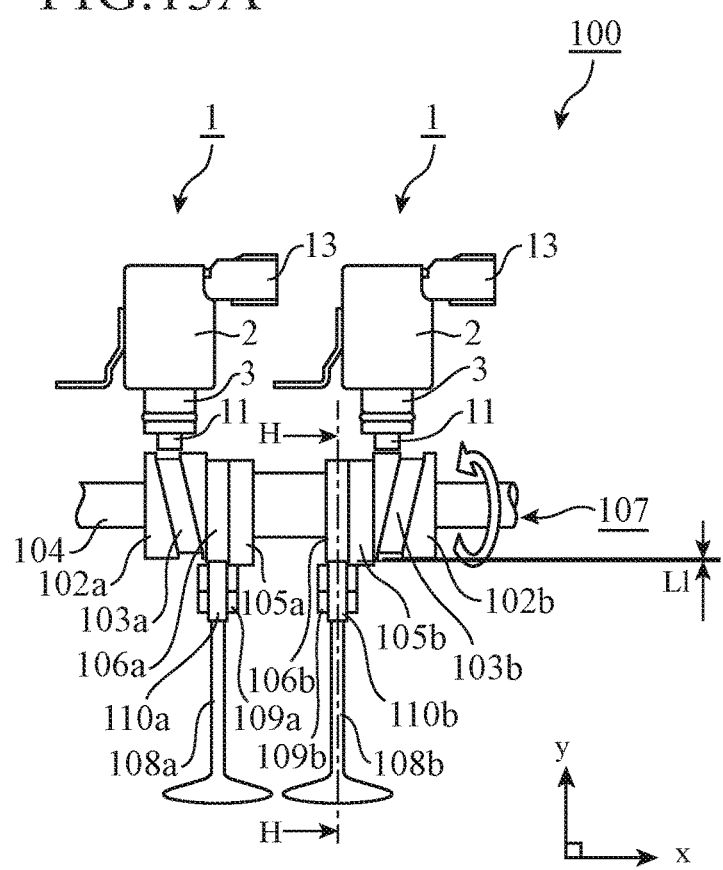
Figure 13B:
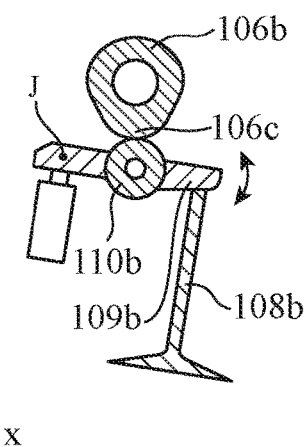

Each of FIG. 12 and FIG. 13 shows the cam switching mechanism for an intake or exhaust valve in the internal combustion engine. FIG. 12A shows the principal portion of the cam switching mechanism when a high cam is used. FIG. 12B is a cross-sectional view taken along the line G-G of FIG. 12A. FIG. 13A shows the principal portion of the cam switching mechanism when a low cam is used. FIG. 13B is a cross-sectional view taken along the line H-H of FIG. 13A. The direction of a y axis in each of FIG. 12 and FIG. 13 is identical to the movement direction A of the movable element 10 shown in FIG. 1.

With reference to FIG. 12 and FIG. 13, a description will be given of a cam switching mechanism 100 that uses two electromagnetic actuators 1 of Embodiment 1.

In each of the two electromagnetic actuators 1, the movable element 10 is operated by supplying electric power to the coil 6 accommodated in the casing 2 from a connector 13, and the tip of the regulating pin 11 integrated with the movable element 10 is pushed out of the casing 3. In addition, when the electric power supply to the connector 13 is stopped and the regulating pin 11 is pushed back into the casing 3, it is possible, by measuring the voltage between the two ends of the connector 13 with a voltmeter or the like, to detect the back electromotive force generated between the two ends of the coil 6 to detect that the regulating pin 11 is returned to an initial position.

Hereinbelow, in the electromagnetic actuator 1, the position of the regulating pin 11 in an axial direction at which the movable element 10 moves to the operation position and a projection length L of the regulating pin 11 from the casing 3 is maximized is referred to as an "ON position". In addition, the position of the regulating pin 11 in the axial direction at which the movable element 10 moves the initial position and the projection length L is maximized is referred to as an "OFF position". Each of FIG. 12A and FIG. 13A shows a state in which each regulating pin 11 of the two electromagnetic actuators 1 is at the OFF position.

Two cylindrical cam pieces 102a and 102b are each disposed so as to oppose the tip of the regulating pin 11 of one of the two electromagnetic actuators 1. Spiral grooves 103a and 103b are provided in the side peripheral portions of the cam pieces 102a and 102b, respectively. The spiral groove 103a of one cam piece 102a and the spiral groove 103b of the other cam piece 102b are opposite in the orientation of the spiral to each other.

At inner ends of the two spiral grooves 103a and 103b, tapered surfaces that gently swell are formed. A return mechanism of the cam switching mechanism 100 is constituted by the tapered surfaces of the spiral grooves 103a and 103b.

A distance between each of the two electromagnetic actuators 1 and each of the cam pieces 102a and 102b is set such that the tip enters the spiral groove 103a or 103b when the regulating pin 11 is at the ON position and the tip moves out of the spiral groove 103a or 103b when the regulating pin 11 is at the OFF position. A camshaft 104 is inserted along the axis of the cam pieces 102a and 102b.

High cams 105a and 105b and low cams 106a and 106b are provided between the cam pieces 102a and 102b. The high cams 105a and 105b and the low cams 106a and 106b are disposed so as to be close to each other. As shown in FIG. 12B, a convex portion 105c is formed on the outer peripheral portion of the high cam 105b. As shown in FIG. 13B, a convex portion 106c is formed on the outer peripheral portion of the low cam 106b. Similarly, the convex portion 105c is formed on the outer peripheral portion of the high cam 105a, and the convex portion 106c is formed on the outer peripheral portion of the low cam 106a. The convex portions 105c of the high cams 105a and 105b are higher than the convex portions 106c of the low cams 106a and 106b.

A cam unit 107 is constituted by the cam pieces 102a and 102b, the high cams 105a and 105b, and the low cams 106a and 106b. The cam unit 107 is, e.g., spline-connected to the camshaft 104, and is configured to rotate about the camshaft 104 integrally with the camshaft 104. In addition, the cam unit 107 is supported so as to be linearly movable relative to the camshaft 104 along the axial direction of the camshaft 104.

Valves 108a and 108b are disposed around the cam unit 107. Rocker rollers 110a and 110b are provided in rocker arms 109a and 109b that support the valves 108a and 108b. The valves 108a and 108b are pressed toward the camshaft 104 by a coil spring and the like, which are not shown, and the rocker rollers 110a and 110b are configured to abut on the high cams 105a and 105b or the low cams 106a and 106b in accordance with the linear movement position of the cam unit 107.

Next, with reference to FIG. 12 and FIG. 13, a description will be given of opening and closing operations of the valves 108a and 108b by the thus configured cam switching mechanism 100.

As shown in FIG. 12, the cam unit 107 rotates in a state in which the high cams 105a and 105b abut on the rocker rollers 110a and 110b. At this point, the convex portions 105c are formed on the outer peripheral portions of the high cams 105a and 105b, and push the rocker rollers 110a and 110b in accordance with the rotation positions of the convex portions 105c, whereby the rocker arms 109a and 109b pivot about ends J on one side. In accordance with the pivoting of the rocker arms 109a and 109b, the valves 108a and 108b move linearly in the radial direction of the high cams 105a and 105b, i.e., in a direction substantially along the y axis in the drawing.

Alternatively, as shown in FIG. 13, the cam unit 107 rotates in a state in which the low cams 106a and 106b abut on the rocker rollers 110a and 110b. At this point, the convex portions 106c are formed on the outer peripheral portions of the low cams 106a and 106b, and push the rocker rollers 110a and 110b in accordance with the rotation positions of the convex portions 106c, whereby the rocker arms 109a and 109b pivot about the ends J on one side. In accordance with the pivoting of the rocker arms 109a and 109b, the valves 108a and 108b move linearly in the radial direction of the low cams 106a and 106b, i.e., the direction substantially along the y axis in the drawing.

At this point, the convex portions 105c of the high cams 105a and 105b are higher than the convex portions 106c of the low cams 106a and 106b, and hence a linear movement range Lh of each of the valves 108a and 108b when the high cams 105a and 105b shown in FIG. 12A are used is larger than a linear movement range L1 of each of the valves 108a and 108b when the low cams 106a and 106b shown in FIG. 13A are used.

Next, with reference to FIG. 12 to FIG. 15, a description will be given of a switching operation of the high cams 105a and 105b and the low cams 106a and 106b by the cam switching mechanism 100.

Figure 14:
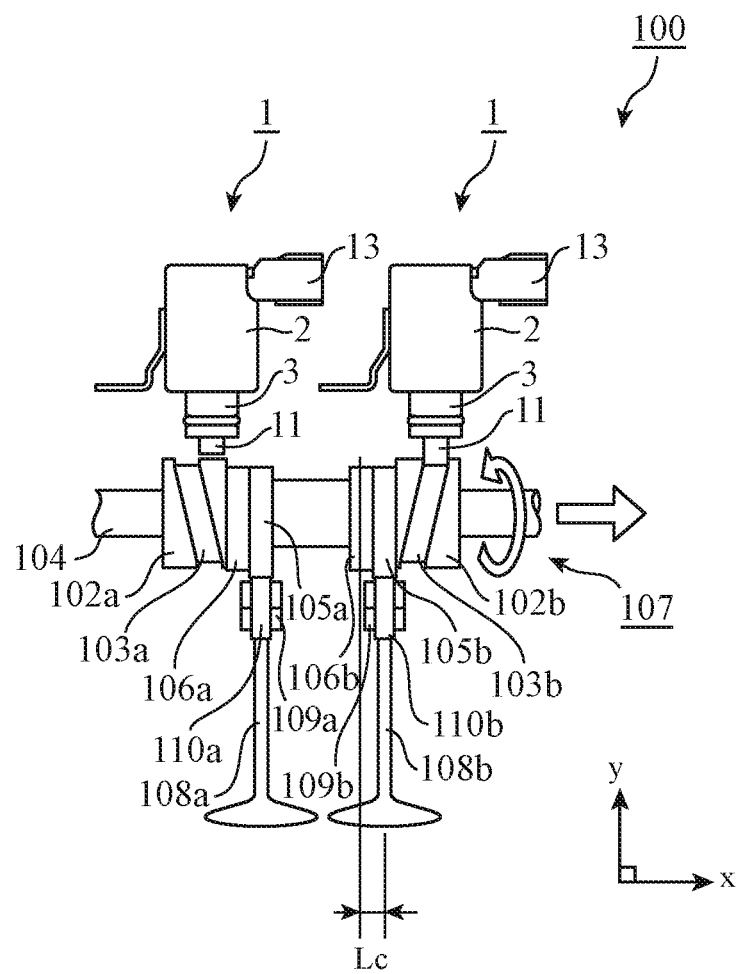
FIG. 14 is an explanatory view showing an operation in which the high cam is switched to the low cam in the cam switching mechanism to which the electromagnetic actuator according to Embodiment 1 is applied.

As shown in FIG. 14, in the state in which the high cams 105a and 105b abut on the rocker rollers 110a and 110b, the electromagnetic actuator 1 on the right side in the drawing switches the regulating pin 11 from the OFF position to the ON position at a timing at which the spiral groove 103b of the cam piece 102b is positioned immediately below the electromagnetic actuator 1, whereby the tip is pushed out and is caused to enter the spiral groove 103b.

With the rotation of the cam unit 107 in a state in which the tip of the regulating pin 11 is in the spiral groove 103b, the cam unit 107 moves in a specific direction along the axis of the camshaft 104, i.e., the positive direction of an x axis in the drawing. Herein, the spiral groove 103b is provided such that the movement range of the cam unit 107 is substantially equal to a distance Lc between respective centers of the high cams 105a and 105b, and the low cams 106a and 106b. With this, cams for the operations of the valves 108a and 108b are switched from the high cams 105a and 105b to the low cams 106a and 106b.

In addition, the tapered surface that gently swells is formed at the end of the spiral groove 103b, and pushes back the tip of the regulating pin 11 toward the electromagnetic actuator 1 by the rotation of the cam unit 107. With this return mechanism, the regulating pin 11 of the electromagnetic actuator 1 returns to the OFF position, and the cam switching mechanism 100 is brought into a state shown in FIG. 13A.

Figure 15:
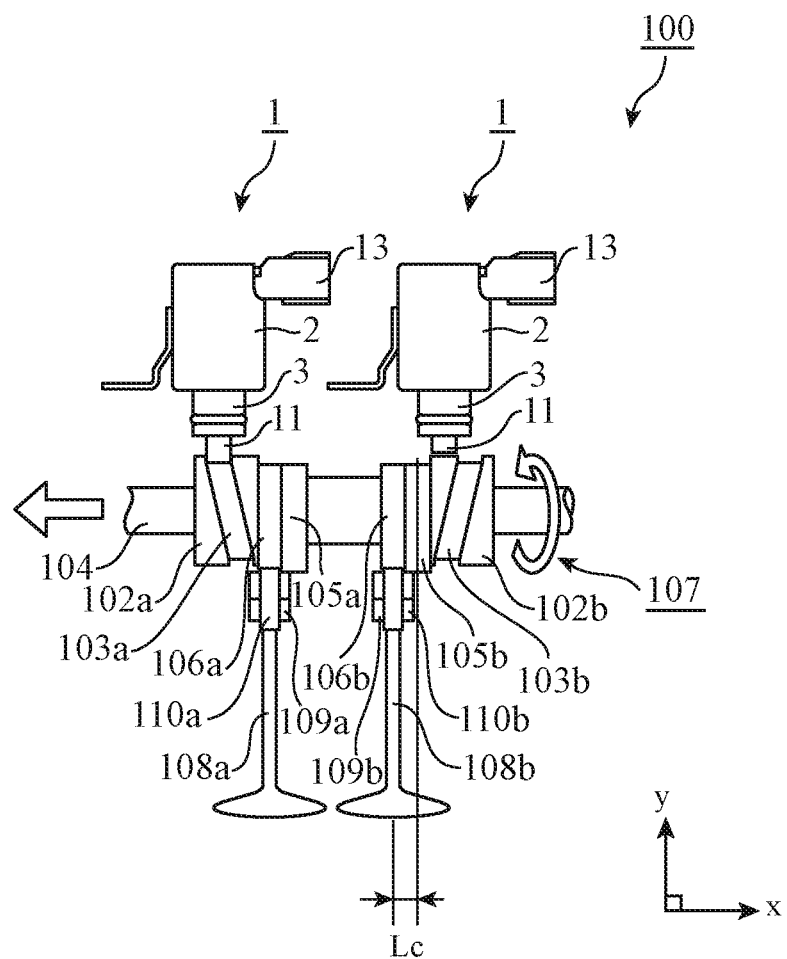
FIG. 15 is an explanatory view showing an operation in which the low cam is switched to the high cam in the cam switching mechanism to which the electromagnetic actuator according to Embodiment 1 is applied.

Similarly, as shown in FIG. 15, in the state in which the low cams 106a and 106b abut on the rocker rollers 110a and 110b, the electromagnetic actuator 1 on the left side in the drawing switches the regulating pin 11 from the OFF position to the ON position at a timing at which the spiral groove 103a of the cam piece 102a is positioned immediately below the electromagnetic actuator 1, whereby the tip is pushed out and is caused to enter the spiral groove 103a.

With the rotation of the cam unit 107 in the state in which the tip of the regulating pin 11 is in the spiral groove 103a, the cam unit 107 moves in a specific direction along the axis of the camshaft 104, i.e., the negative direction of the x axis in the drawing. Herein, the orientation of the spiral of the spiral groove 103a is opposite to that of the spiral groove 103b, and hence the cam unit 107 moves in a direction opposite to that in the state shown in FIG. 14. With this, the cams used for the operations of the valves 108a and 108b are switched from the low cams 106a and 106b to the high cams 105a and 105b.

In addition, the tapered surface that gently swells is formed at the end of the spiral groove 103a similarly to the end of the spiral groove 103b, and pushes back the tip of the regulating pin 11 toward the electromagnetic actuator 1 by the rotation of the cam unit 107. With this return mechanism, the regulating pin 11 of the electromagnetic actuator 1 returns to the OFF position, and the cam switching mechanism 100 is brought into a state shown in FIG. 12A.

In view of the foregoing, according to Embodiment 1, the electromagnetic actuator 1 is configured to include the casings 2 and 3 that are made of magnetic material, the stator core that is installed in the casings 2 and 3, the coil 6 that generates the magnetic flux in the stator core, the permanent magnet 7 that generates the attraction force to and the repulsive force from the stator core, and the plunger 8 that is integrated with the permanent magnet 7, is held at the initial position by the attraction of the permanent magnet 7 to the stator core when the coil 6 is not energized, and moves from the initial position by the repulsion of the permanent magnet 7 from the stator core when the coil 6 is energized. In addition, the stator core has the structure in which a plurality of the divided cores 4 and 5, which are split cores, are arranged in the movement direction A of the plunger 8, the hole for allowing the plunger 8 to pass therethrough is formed in at least the divided core 5 as one of the plurality of the divided cores 4 and 5 that is closest to the permanent magnet 7 side, and the plunger 8 is formed into the shape that allows the plunger 8 to enter the stator core from the hole formed in the divided core 5 up to the position at which the plunger 8 magnetically connects the divided cores 4 and 5 at the initial position, and hence the magnetic resistance of the magnetic path that passes through the coil 6 rapidly changes due to the positional relationship between the division portion of the divided cores 4 and 5 and the plunger 8, the magnetic flux D that flows through the magnetic path rapidly changes, and the large back electromotive force is generated.

By detecting the back electromotive force, it becomes possible to detect the position of the plunger 8, and it is possible to use the position of the plunger 8 in monitoring of the actuation state of the electromagnetic actuator 1, abnormality detection and the like.

In addition, a change in flux linkage through a coil is increased to a large extent by the change of the position of the plunger 8, and hence, even in the casing where thermal demagnetization or the like occurs and the magnetic flux of the permanent magnet 7 is reduced or varied, a back electromotive force is generated and it is possible to detect the position of the plunger 8.

Further, even in the casing where the movement speed of the plunger 8 is slow, it is possible to secure the amount of the flux linkage through coil by the change of the position, and hence it is possible to reduce the movement speed of the movable element 10 by using an air damper function or the like. With this, it is possible to reduce noises when the movable element 10 abuts on the divided core 5 or the casing 3.

In addition, according to Embodiment 1, the plunger 8 is configured to have the plate 81 that abuts on the divided core 5 as one of the plurality of the divided cores 4 and 5 that is closest to the permanent magnet 7 side and the projection 82 that projects from the plate 81 and enters the hole formed in the divided core 5, and hence the plate 81 of the plunger 8 abuts on the divided core 5 and it is thereby possible to obtain the large attraction force and repulsive force. Further, by enlarging the plate 81 in the radial direction, the plate 81 serves as the magnetic path through which the magnetic flux is flown to the casing 2.

In addition, according to Embodiment 1, the divided core 5 as one of the plurality of the cores 4 and 5 that is closest to the permanent magnet 7 side is configured to have the plate 51 in which the hole for allowing the plunger 8 to pass therethrough is formed and the tubular projection 52 that projects from the edge of the hole toward the other divided core 4, and hence the plate 51 of the divided core 5 abuts on the plate 81 of the plunger 8 and it is thereby possible to obtain the large attraction force and repulsive force. Further, by enlarging the plate 51 of the divided core 5, the plate 51 serves as the magnetic path through which the magnetic flux is flown to the casing 2.

In addition, according to Embodiment 1, the plungers 8 and 9 are constituted by the two magnetic bodies between which the permanent magnet 7 is sandwiched, and hence it is possible to effectively use the leakage flux of the permanent magnet 7. Further, it is possible to protect the permanent magnet 7 from the impact.

In addition, according to Embodiment 1, the plunger 9 as one of the plungers 8 and 9 that is on the side far from the stator core is configured to have the plate-like shape, and hence it is possible to effectively use the leakage flux of the permanent magnet 7. Further, by enlarging the plate-like plunger 9 in the radial direction, the plunger 9 serves as the magnetic path through which the magnetic flux is flown to the casing 2.

In addition, according to Embodiment 1, as shown in FIG. 8A, in the casing where the plunger 8 as one of the plungers 8 and 9 that is on the side close to the stator core is constituted by the plate 81 that covers one of the surfaces of the permanent magnet 7 and abuts on the divided core 5 and the projection 82 that projects from the plate 81 and enters the hole formed in the divided core 5, and the plunger 9 that is on the side far from the stator core is configured to have the plate-like shape that covers the other surface of the permanent magnet 7, it is possible to efficiently generate the back electromotive force.

On the other hand, as shown in FIG. 8B, in the casing where the plunger 8f as one of the plungers 8 and 9 that is on the side close to stator core is configured to have the plate-like shape that covers one of the surfaces of the permanent magnet 7 and abuts on the divided core 5, and the plunger 9f that is on the side far from the stator core is constituted by the plate 91f that covers the other surface of the permanent magnet 7 and the projection 92f that projects from the plate 91f, passes through the permanent magnet 7, and enters the hole formed in the divided core 5, assembly thereof is facilitated, and the permanent magnet 7 is not easily decentered.

In addition, according to Embodiment 1, as shown in FIG. 2, in the casing where the configuration is adopted in which the position of the end of the projection 82 of the plunger 8 at the initial position and the position of the division portion of the divided cores 4 and 5 are aligned, it is possible to detect the movable element 10 at the initial position.

On the other hand, as shown in FIG. 6, in the casing where the configuration is adopted in which the position of the end of the projection 82 of the plunger 8 and the position of the division portion of the divided cores 4 and 5 are offset at the initial position, it is possible to detect the movable element 10 at a position other than the initial position.

Note that, in the above description, the configuration of Embodiment 1 is applied to the electromagnetic actuator of the type that has one regulating pin, but the configuration of Embodiment 1 can also be applied to the electromagnetic actuator of the type that has two or more regulating pins.

In the present invention, in addition to the modifications and omissions described above, it is possible to modify any components in the embodiments or omit any components in the embodiments within the scope of the invention.

INDUSTRIAL APPLICABILITY

Since the electromagnetic actuator according to the invention moves from the initial position by using the repulsive force between the magnetic pole generated in the stator core by energizing the coil and the magnetic pole of the permanent magnet as the drive source and returns to the initial position by the force from the outside, the electromagnetic actuator is suitably used in the cam switching mechanism or the like that adjusts the valve lift amount of the internal combustion engine.

REFERENCE SIGNS LIST

1, 1a, 1b, 1g, 1h, 1i, 1j: Electromagnetic actuator; 2, 3: Casing; 4, 5: Divided core; 4a: Core; 4g: Connection portion; 4h-1 to 4h-3: Divided core; 4j: Divided core; 51: Plate; 52: Projection; 6: Coil; 7, 7j: Permanent magnet; 8, 8c to 8f, 8j, 9, 9f, 9j: Plunger; 81: Plate; 82, 82b to 82e, 82j: Projection; 91f: Plate; 92f: Projection; 10, 10f: Movable element; 11: Regulating pin; 12: Plunger guide; 13: Connector; 100: Cam switching mechanism; 102a, 102b: Cam piece; 103a, 103b: Spiral groove; 104: Camshaft; 105a, 105b: High cam; 105c, 106c: Convex portion; 106a, 106b: Low cam; 107: Cam unit; 108a, 108b: Valve; 109a, 109b: Rocker arm; 110a, 110b: Rocker roller

The invention claimed is:

1. An electromagnetic actuator comprising:
a casing made of magnetic material;
a core installed in the casing;
a coil for generating magnetic flux in the core;
a permanent magnet for generating an attraction force to or a repulsive force from the core; and
a plunger integrated with the permanent magnet and configured to be held at an initial position by attraction of the permanent magnet to the core when the coil is not energized, and to move from the initial position by repulsion of the permanent magnet from the core when the coil is energized, wherein
the core has a structure in which a plurality of divided cores, which are magnetically divided, are arranged in a movement direction of the plunger and a hole for allowing the plunger to pass therethrough is formed in at least a divided core of the plurality of the divided cores that is closest to the permanent magnet side, and the plunger is formed in a shape that allows the plunger to enter the core from the hole formed in the divided core up to a position at which at least two of the plurality of the divided cores are magnetically connected to each other, at the initial position.

2. The electromagnetic actuator according to claim 1, wherein the core is constituted by two of the divided cores.

3. The electromagnetic actuator according to claim 1, wherein the plunger has a plate that abuts on a divided core of the plurality of the divided cores that is closest to the permanent magnet side, and a projection that projects from the plate and enters the hole formed in the divided core.

4. The electromagnetic actuator according to claim 3, wherein the divided core of the plurality of the divided cores that is closest to the permanent magnet side has a plate in which a hole for allowing the plunger to pass therethrough is formed, and a tubular projection that projects from an edge of the hole to the side of other divided cores.

5. The electromagnetic actuator according to claim 1, wherein the plurality of the divided cores are arranged so as to form a gap therebetween.

6. The electromagnetic actuator according to claim 1, wherein the plunger is constituted by two magnetic bodies between which the permanent magnet is sandwiched.

7. The electromagnetic actuator according to claim 3, wherein the projection of the plunger is cylindrical or columnar.

8. The electromagnetic actuator according to claim 6, wherein, of the two magnetic bodies constituting the plunger, a magnetic body that is on a side far from the core has a plate-like shape.

9. The electromagnetic actuator according to claim 6, wherein, of the two magnetic bodies constituting the plunger,
a magnetic body that is on a side close to the core has a plate that covers one of surfaces of the permanent magnet and abuts on a divided core of the plurality of the divided cores that is closest to the permanent magnet side, and a projection that projects from the plate and enters the hole formed in the divided core, and
a magnetic body that is on a side far from the core has a plate that covers another surface of the permanent magnet.

10. The electromagnetic actuator according to claim 6, wherein, of the two magnetic bodies constituting the plunger,
a magnetic body that is on a side close to the core has a plate that covers one of surfaces of the permanent magnet and abuts on a divided core of the plurality of the divided cores that is closest to the permanent magnet side, and
a magnetic body that is on a side far from the core has a plate that covers another surface of the permanent magnet, and a projection that projects from the plate, passes through the permanent magnet, and enters the hole formed in the divided core.

11. The electromagnetic actuator according to claim 3, wherein a position of an end of the projection of the plunger and a position of a division portion of at least two of the plurality of the divided cores are aligned at the initial position.

12. The electromagnetic actuator according to claim 3, wherein a position of an end of the projection of the plunger and a position of a division portion of at least two of the plurality of the divided cores are offset at the initial position.

13. The electromagnetic actuator according to claim 1, which is used to switch a cam that operates an intake valve or an exhaust valve of an internal combustion engine.

\* \* \* \* \*